United States Patent [19]

Buding et al.

[11] Patent Number: 5,034,469

[45] Date of Patent: Jul. 23, 1991

[54] HYDROGENATION OF UNSATURATED POLYMERS CONTAINING NITRILE GROUPS

[75] Inventors: Hartmuth Buding, Dormagen; Joachim Thörmer, Leverkusen; Wilfried Nolte, Odenthal; Johann Hohn, Dormagen; Paul-Christian Fiedler; Thomas Himmler, both of Cologne, all of Fed. Rep. of Germany

[73] Assignee: Bayer Aktiengesellschaft, Leverkusen, Fed. Rep. of Germany

[21] Appl. No.: 539,548

[22] Filed: Jun. 18, 1990

[30] Foreign Application Priority Data

Jun. 29, 1989 [DE] Fed. Rep. of Germany ....... 3921264

[51] Int. Cl.$^5$ .................................................. C08F 8/04
[52] U.S. Cl. .................................... 525/338; 525/329.3
[58] Field of Search ................................. 525/338, 339

[56] References Cited

U.S. PATENT DOCUMENTS

| | | | |
|---|---|---|---|
| 3,454,644 | 7/1969 | Dewhirst | 260/570.9 |
| 4,452,951 | 6/1984 | Kubo et al. | 525/338 |
| 4,631,315 | 12/1986 | Buding et al. | 525/338 |
| 4,656,230 | 4/1987 | Shyr et al. | 525/338 |
| 4,746,707 | 3/1988 | Fiedler et al. | 525/338 |
| 4,795,788 | 1/1989 | Himmler et al. | 525/338 |
| 4,812,528 | 3/1989 | Rempel et al. | 525/338 |
| 4,816,525 | 3/1989 | Rempel et al. | 525/338 |
| 4,876,314 | 10/1989 | Hoxmeir et al. | 525/338 |
| 4,892,928 | 1/1990 | Hoxmeir | 525/338 |
| 4,954,576 | 9/1990 | Kubo et al. | 525/338 |

*Primary Examiner*—Bernard Lipman
*Attorney, Agent, or Firm*—Connolly and Hutz

[57] ABSTRACT

Hydrogenation products of olefinically unsaturated polymers having nitrile groups prepared in the presence of ruthenium catalysts in a solvent comprising a low-molecular ketone and a secondary or tertiary $C_3$–$C_6$-alcohol by hydrogenation, can be processed to vulcanizates with improved compression set values.

1 Claim, No Drawings

HYDROGENATION OF UNSATURATED POLYMERS CONTAINING NITRILE GROUPS

The invention relates to a process for the selective hydrogenation of olefinically unsaturated polymers containing nitrile groups with hydrogen in the presence of hydrogenation catalysts in organic solvents. "Selective hydrogenation" in the sense of the invention is understood as meaning the hydrogenation of the olefinic CC double bonds while retaining the CN triple bonds. In this connection, "while retaining the CN triple bonds" means that less than 7, preferably less than 5, in particular less than 3 and specifically less than 1.5% of the nitrile groups originally present in the polymeric starting substance are hydrogenated.

U.S.-PS No. 3 700 637 describes the hydrogenation of the CC double bonds of diene/(meth)acrylonitrile copolymers homogeneously with rhodium-halogen complex catalysts in chlorobenzene. The suitablility of other metals, such as platinum, ruthenium, iridium, palladium, rhenium, cobalt or copper, homogeneously or heterogeneously, is disclosed.

DE-OS No. 2 539 132 describes a selective hydrogenation of butadiene/acrylonitrile copolymers with the same and similar rhodium catalysts, in which the CN triple and cis-double bonds are retained and the vinylic and trans-double bonds are hydrogenated quantitatively, using chlorobenzene as the solvent. In other solvents, in particular ketones, only low degrees of hydrogenation are achieved.

The selective hydrogenation of nitrile rubber with small amounts of rhodium complex compounds and up to 2 wt. % triphenylphosphane is claimed in EP-PS No. 134 023.

Since the occurrence of rhodium is very small and rhodium is employed not only in the chemical industry, but predominantly in the electrical industry, in the glass and ceramics industry and recently especially in the automobile industry (exhaust catalysts), a scarcity of this noble metal cannot be excluded in the future. Hydrogenation processes which are independent of rhodium catalysts have therefore already been sought in the past. There has been no lack of proposals.

DE-OS No. 33 37 294 describes a hydrogenation process for olefins using ruthenium-cyclopentadienyl complexes in organic solvents, such as e.g. toluene, 2-propanol or butanone.

A process for the selective hydrogenation of olefinically unsaturated polymers using ruthenium-indenyl complexes in ketones as solvents is known from DE-OS No. 35 41 689.

DE-OS No. 35 40 918 describes the selective hydrogenation of olefins containing nitrile groups using ruthenium hydridophosphane complexes in ketones as solvents.

EP No. 298 386 discloses the hydrogenation of CC double bonds in copolymers of conjugated dienes with ruthenium-CO and/or -NO complexes in organic solvents, such as e.g. benzene, toluene, xylene, chlorobenzene, dichlorobenzene, ethers and ketones.

DE-OS No. 35 29 252 relates to the selective hydrogenation of olefinically unsaturated compounds containing nitrile groups using rutheniumhydridocarboxylato complexes in ketones as solvents.

The use of tris(triphenylphosphane)-ruthenium(II) chloride in benzene/ethanol solutions as a hydrogenation catalyst for olefins is reported by Wilkinson et al., J. Chem. Soc. (A) 3143 (1968). If the ethanol in the solvent is replaced by methanol, tert.-butanol or 2-propanol, the hydrogenation result is said to vary. It is also said to be possible to use chlorobenzene and also pure alcohols as the solvent.

DE-OS No. 3 433 392 describes a process for the selective hydrogenation of olefinically unsaturated polymers containing nitrile groups using ruthenium complex catalysts, a low molecular weight ketone being used as the solvent. However, the examples contained in DE-OS No. 3 433 392 show that products having high gel contents are obtained with ruthenium complex catalysts in chlorobenzene, which according to the prior art is a suitable solvent for the hydrogenation of olefinically unsaturated polymers containing nitrile groups.

High quality rubber articles, such as e.g. seals, can be produced by vulcanization from the olefinically unsaturated polymers which contain nitrile groups and have been hydrogenated in accordance with the prior art. However, these polymers are not always adequate for specific uses in the sealing sector, where particularly good compression sets of the vulcanization products are required. The compression set is an essential test criterion for many rubber articles, such as e.g. hoses, seals and boots.

The object of the present invention was thus to render accessible vulcanization products of improved compression set from olefinically unsaturated polymers which contain nitrile groups and have been hydrogenated using ruthenium catalysts.

It has been found, surprisingly, that the conditions of the hydrogenation process can have an influence on the compression set of the vulcanization products of these hydrogenation products, and that in particular the nature of the solvent used also determines the compression set of these vulcanization products.

The invention relates to a process for the selective hydrogenation of olefinically unsaturated polymers containing nitrile groups with hydrogen in the presence of a hydrogenation catalyst in an organic solvent, characterized in that (i) the hydrogenation catalyst used is a ruthenium compound of the formula

$$RuX_{2y}[(L^1)_n (L^2)_{5-z}] \tag{I}$$

wherein
X denotes hydrogen, halogen or $SnCl_3$,
$L^1$ denotes hydrogen, halogen, $(R^6\text{-}COO)_n$ or cyclopentadienyl of the formula

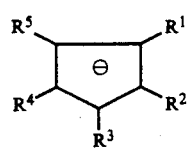

in which $R^1$ to $R^5$ independently of one another represent hydrogen, methyl, ethyl or phenyl, it also being possible for adjacent substituents together to form a hydrocarbon radical such that $L^1$ is an indenylorafluorenyl system,
$L^2$ denotes a phosphane, bisphosphane or arsane and y denotes zero, 0.5 or 1,
n denotes 1 or 2,
z denotes an integer from 1 to 4 and R[6] denotes alkyl, cycloalkyl, aryl or aralkyl having 1 to 20 C atoms, and (ii) the solvent used is a mixture of (a) a $C_3$–$C_6$ ketone and (b) a monohydric secondary or tertiary $C_3$–$C_6$-alcohol, the weight content of (b) in the solvent (ii) being 2 to 60, preferably 5 to 50 and in particular 7 to 40%.

Examples of L[1] ligands of the cyclopentadienyl type include cyclopentadienyl, pentamethylcyclopentadienyl, ethyltetramethylcyclopentadienyl, pentaphenylcyclopentadienyl, dimethyltriphenylcyclopentadienyl, indenyl and fluorenyl. The benzo rings in the L[1] ligands of the indenyl and fluorenyl type can be substituted by alkyl radicals having 1 to 6 C atoms, in particular methyl, ethyl and isopropyl, alkoxy radicals having 1 to 4 C atoms, in particular methoxy and ethoxy, aryl radicals, in particular phenyl, and halogens, in particular fluorine and chlorine. Preferred L1 ligands of the cyclopentadienyl type are the radicals, in each case unsubstituted, cyclopentadienyl, indenyl and fluorenyl.

In the ligand L[1] of the type (R[6]-COO)$_n$, R[6] includes, for example, straight-chain or branched, saturated hydrocarbon radicals having 1 to 20, preferably 1 to 12, in particular 1 to 6, C atoms, cyclic, saturated hydrocarbon radicals having 5 to 12, preferably 5 to 7, C atoms, aromatic hydrocarbon radicals from the benzene series having 6 to 18, preferably 6 to 10, C atoms, and aryl-substituted alkyl radicals which consist of a straight-chain or branched hydrocarbon radical having 1 to 6 C atoms in the aliphatic part and of a radical of the benzene series, preferably phenyl, in the aromatic part.

The radicals R[6] described above can optionally be substituted by hydroxyl, $C_1$-$C_6$-alkoxy, $CH_1$-carbalkoxy, fluorine, chlorine or di-$C_1$-$C_4$-alkylamino and the cycloalkyl, aryl and aralkyl radicals moreover by $C_1$- to $C_6$-alkyl. Alkyl, cycloalkyl and aralkyl groups can contain keto groups.

Examples of the radical R[6] are methyl, ethyl, propyl, iso-propyl, tert.butyl, cyclohexyl, phenyl, benzyl and trifluoromethyl. Preferred radicals R[6] are methyl, ethyl and tert.-butyl.

Preferred L[2] ligands are phosphanes and arsanes of the formulae

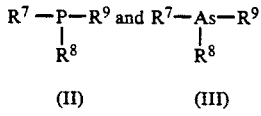

(II)            (III)

in which R[7], R[8] and R[9] independently of one another correspond to the meaning of R[6].

Preferred L[2] ligands of the formulae (II) and (III) are triphenylphosphane, diethylphenylphosphane, tritolylphosphane, trinaphthylphosphane, diphenylmethylphosphane, diphenylbutylphosphane, tris-(p-carbomethoxyphenyl)phosphane, tris-(p-cyanophenyl)-phosphane, tributylphosphane, tris(trimethoxyphenyl)-phosphane, bis-(trimethylphenyl)-phenylphosphane, bis-(trimethoxyphenyl)-phenylphosphane, trimethylphenyldiphenylphosphane, trimethoxyphenyldiphenylphosphane, tris-(dimethylphenyl)-phenylphosphane, tris-(dimethoxyphenyl)-phosphane, bis-(dimethylphenyl)-phenylphosphane, bis-(dimethoxyphenyl)-phenylphosphane, dimethylphenyldiphenylphosphane, dimethoxyphenyldiphenylphosphane, triphenylarsane, ditolylphenylarsane, tris-(4-ethoxyphenyl)-arsane, diphenylcyclohexylarsane, dibutylphenylarsane and diethylphenylarsane. Triarylphosphanes, in particular triphenylphosphane, are particularly preferred.

Other examples of L[2] ligands are bisphosphanes of the formula

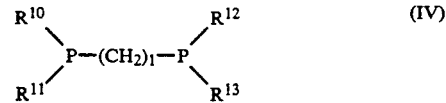

in which l represents an integer from 1 to 10 and the radicals R[10], R[11], R[12] and R[13] independently of one another have the meaning of R[6].

Examples of bisphosphanes are 1,2-bis-diphenylphosphanoethane, 1,2-bisdianisylphosphanoethane, 1,3-bis-diphenylphosphanopropane and 1,4-bisdiphenylphosphanobutane. 1,2-Bis-diphenylphosphanoethane is preferred, and 1,3-bis-diphenylphosphanopropane and 1,4-bis-diphenylphosphanobutane are particularly preferred.

The definition of the compounds (I) in the sense of the invention is also to include those compounds in which L[1] and L[2] are bonded to one another by one or more covalent bonds. Examples of such an embodiment are compounds of the formula

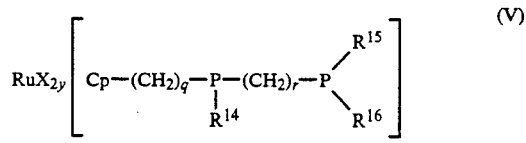

Cp: cyclopentadienyl wherein q and r independently of one another denote an integer from 1 to 6 and the radicals R[14] to R[16] independently of one another have the meaning of R[6].

Examples of such ligands (V) are 1,4-diphospha-6-cyclopentadienyl-1,1,4-triphenylhexane, preferably 1,5-diphospha-7-cyclopentadienyl-1,1,5-triphenylheptane, and in particular 1,6-diphospha-8-cyclopentadienyl-1,1,6-triphenyloctane.

The ruthenium complexes (I) used are for the most part known and can be prepared e.g. in accordance with P. S. Hallmann, B. R. McGarvey and G. Wilkinson in J. Chem. Soc. (A), 1968, p. 3143–3150, M. I. Bruce, N. J. Windsor in Aust. J. Chem. 30, (1977), p. 1601–1604, T. Kauffmann and J. Olbrich in Tetrahedron Letters 25, (1984), p. 1967–1970, T. Wilczewsky, M. Bochenska and J. F. Biernat in J. Organomet. Chem. 215, (1981), p. 87–96, R. W. Mitchell, A. Spencer and G. Wilkinson in J. Chem. Soc. Dalton 1973, p. 852, D. Rose, J. D. Gilbert, R. P. Richardson and G. Wilkinson in J. Chem. Soc. (A) 1969, p. 2914–2915, A. Dobson, S. D. Robinson and M. F. Uttley in J. Chem. Soc. Dalton 1975, p. 376, L. A. Oro, M. A. Ciriano, M. Campo, C. Foces-Foces and F. H. Cano in J. Organomet. Chem. 289 (1985) 117–131, DE-OS No. 33 37 294, R. O. Harris, N. K. Hota, L. Sadavoy and M. J. C. Yuen in J. Organomet. Chem. 54 (1973) 259–264 or T. Blackmore, M. I. Bruce and F. G. A Stoue in J. Chem. Soc., Section A 1971, p. 2376–2382, or in an analogous manner.

Particularly preferred ruthenium complex catalysts of the formula (I) for the process according to the invention are:

$RuCl_2(PPh_3)_3$
$RuHCl(PPh_3)_3$

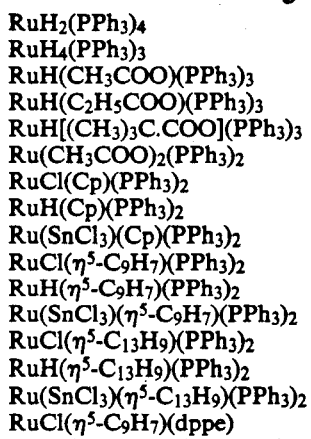

RuH$_2$(PPh$_3$)$_4$
RuH$_4$(PPh$_3$)$_3$
RuH(CH$_3$COO)(PPh$_3$)$_3$
RuH(C$_2$H$_5$COO)(PPh$_3$)$_3$
RuH[(CH$_3$)$_3$C.COO](PPh$_3$)$_3$
Ru(CH$_3$COO)$_2$(PPh$_3$)$_2$
RuCl(Cp)(PPh$_3$)$_2$
RuH(Cp)(PPh$_3$)$_2$
Ru(SnCl$_3$)(Cp)(PPh$_3$)$_2$
RuCl($\eta^5$-C$_9$H$_7$)(PPh$_3$)$_2$
RuH($\eta^5$-C$_9$H$_7$)(PPh$_3$)$_2$
Ru(SnCl$_3$)($\eta^5$-C$_9$H$_7$)(PPh$_3$)$_2$
RuCl($\eta^5$-C$_{13}$H$_9$)(PPh$_3$)$_2$
RuH($\eta^5$-C$_{13}$H$_9$)(PPh$_3$)$_2$
Ru(SnCl$_3$)($\eta^5$-C$_{13}$H$_9$)(PPh$_3$)$_2$
RuCl($\eta^5$-C$_9$H$_7$)(dppe)

In these complexes, "Ph" denotes phenyl, "Cp" denotes cyclopentadienyl and "dppe" denotes 1,2-bis-diphenylphosphanoethane.

The catalysts (I) are as a rule soluble in ketones at room temperature (preferably at elevated temperature). More precisely, of 3.4 g catalyst in 2 l butanone at 20° C., in general more than 50 wt. %, preferably more than 65 wt. %, in particular more than 80 wt. %, dissolves.

Examples of preferred solvent components (a) are acetone, butanone, pentanones, cyclopentanone and cyclohexanone and mixtures thereof. Preferably, only a single ketone is employed as the solvent component (a). Butanone and in particular acetone are preferred.

Examples of preferred solvent components (b) are 2-propanol, 2-butanol, 2-methyl-2-propanol, 2- and 3-pentanol, 3-methyl-2-butanol, 2-methyl-2-butanol, 2-, 3- and 4-hexanol and 4-methyl-2-pentanol. The preferred alcohol is 2-methyl-2-propanol and in particular 2-butanol, and 2-propanol is especially preferred.

Olefinically unsaturated polymers containing nitrile groups which are to be employed for the process according to the invention in general have average molecular weights $\overline{M}_n$, determined as the number-average, of 500 to 500,000, preferably 5,000 to 400,000, in particular 10,000 to 350,000, and specifically 15,000 to 300,000. The molecular weights $\overline{M}_n$ can be determined by gel permeation chromatography using polystyrene as the standard.

Preferred olefinically unsaturated polymers containing nitrile groups include copolymers of 90 to 40 wt. %, preferably 85 to 50 wt. %, of at least one conjugated diene, 10 to 60 wt. %, preferably 15 to 50 wt. %, of at least one unsaturated nitrile and 0 to 10 wt. %, preferably 0 to 8 wt. %, of at least one other monomer which can be copolymerized with conjugated dienes and unsaturated nitriles.

Possible conjugated dienes are e.g. buta-1,3-diene, 2-methylbuta-1,3-diene, 2,3-dimethylbuta-1,3-diene and penta-1,3-diene, and possible unsaturated nitriles are acrylonitrile and methacrylonitrile.

Possible other monomers are vinylaromatics, such as styrene, o-, m- or p-methylstyrene, ethylstyrene, vinylnaphthalene and vinylpyridine, $\alpha,\beta$-unsaturated monocarboxylic acids having 3 to 5 C atoms, such as acrylic acid, methacrylic acid and crotonic acid, and $\alpha,\beta$-unsaturated dicarboxylic acids having 4 to 5 C atoms, such as maleic, fumaric, citraconic and itaconic acid, and furthermore vinyl chloride, vinylidene chloride, N-methylolacrylamide and vinyl C$_1$-C$_4$-alkyl ethers.

The most preferred olefinically unsaturated polymers containing nitrile groups are nitrile rubbers having glass transition temperatures below 0° C., preferably below -7° C. Preferred nitrile rubbers are butadiene/acrylonitrile copolymers having a copolymerized acrylonitrile content of 10 to 60, preferably 15 to 50 wt. %. As a rule, they have Mooney viscosities (DIN No. 53 523) of 10 to 150, preferably 25 to 95 (ML 1+4/100° C.).

Both the olefinically unsaturated polymers containing nitrile groups used as starting substances and the hydrogenation products prepared therefrom should be soluble in the organic solvent used.

Under adverse circumstances, in particular at high polymer concentrations in the hydrogenation solution at high molecular weights of the polymers, at high alcohol contents in the solvent (ii) and at lower temperatures, demixing may occur between the polymer and solvent. A single-phase mixture which is easy to handle can usually be obtained again from such demixed systems by stirring and at the same time increasing the temperature. In these cases—as long as the polymer has swollen well in the solvent—the hydrogenation does not usually suffer from this demixing.

The concentration of catalyst, based on the polymer (calculated as ruthenium), is in general 2 to 500, preferably 4 to 400 ppm, particularly preferably 5 to 300 ppm. The concentration of unsaturated polymer, based on the total solution, is in general 1 to 99, preferably 5 to 40 wt. %.

The hydrogenation is advantageously carried out at 20° to 250° C., preferably at 80° to 200° C., in particular at 100° to 180° C. and especially preferably at 120° to 160° C., and under a hydrogen pressure of 1 to 350 bar, preferably of 5 to 250 bar, in particular of 10 to 200 bar.

The degrees of hydrogenation (percentage of hydrogenated CC double bonds, based on the total number of CC double bonds originally present in the polymer) can be up to 100%. However, the hydrogenation can be interrupted beforehand if necessary. Polymers having degrees of hydrogenation of more than 80%, preferably of more than 90%, in particular of more than 95% and especially preferably of more than 99% are in general prepared.

The degree of hydrogenation of the polymers can be determined by means of NMR and IR spectroscopy.

After the hydrogenation, the reaction products can be separated off from the solution with the aid of customary methods. Customary methods include e.g. evaporation of appropriate under reduced pressure), blowing in steam and addition of a precipitating agent (nonsolvent). The separation can be followed by drying to remove residual solvent or water.

The polymers hydrogenated according to the invention are in general soluble in solvents such as e.g. acetone, butanone, tetrahydrofuran, methylene chloride, chloroform and chlorobenzene.

If the hydrogenation products are rubbers, they can be vulcanized in the customary manner by peroxide or sulphur vulcanization or by radiation crosslinking.

Provided they have sufficiently high molecular weights, the polymers hydrogenated according to the invention can be processed to vulcanization products with excellent resistance to weathering, ozone, oil and hot air and a good flexibility at low temperatures. Preferred fields of use of these vulcanization products are e.g. seals, hoses, toothed and drive belts, membranes, cable sheathings and torsional vibration dampers.

EXAMPLES

Some examples (examples 1, 2, 5, 6, 14, 16) in accordance with DE-OS Nos. 3 433 392, 3 529 252 and 3 540 918 have been included below as prior art for comparison.

For technological testing, the polymers were precipitated by blowing steam into the reaction mixture and then dried in vacuo at between 40° and 60° C. The properties of the polymers described below are [a] the degree of hydrogenation after isolation of the polymer (%, determined by infra-red spectroscopy), [b] the gel value (wt. %, measured in butanone), [c] the Mooney viscosity ML 1+4 (100° C.), [d] the Defo viscosity $V_{10}$ (Ns, 80° C.) (R. Koopmann, Kautschuk+Gummi, Kunststoffe 36, no. 2, p.108 et seq. (1983)) and [e] the Defo elasticity $DE_{30}$ (1/10 mm, 80° C.) (see Lit. as under [d]). To measure the Mooney viscosity, 150 g polymer were let through a 350 mm wide laboratory roll mill (cooling water temperature 20° C., roll nip 0.4 mm, friction 1:1.2, front roll 20 rpm) twice. After the milled sheet had been left for at least 30 minutes, further testing was carried out in accordance with DIN No. 53 523, part 2 and 3.

The standards DIN Nos. 53 502, 53 504, 53 505 and 53 517 (standard test specimen 1) were used for the measurements, S denoting the tensile strength, E the elongation at break, $M_{100}$ and $M_{200}$ the modulus at 100 and 200% elongation respectively, $H_{23}$ the Shore A hardness at 23° C. and CS the compression set at 150° C./70 h.

EXAMPLE 1 (COMPARISON EXAMPLE)

A solution, carefully prepared with exclusion of oxygen, of 2.1 kg of a randomly built up acrylonitrile/-butadiene emulsion polymer (acrylonitrile content: 33.9 wt. %; Mooney viscosity ML 1+4 (100° C.) of 28) in 17.9 kg butanone was initially introduced into a 40 l autoclave rendered inert with nitrogen. The solution was heated up to 125° C. in the absence of hydrogen, a solution, likewise prepared with exclusion of oxygen, of 3.327 g tris(triphenylphosphane)-ruthenium(II) chloride (167 ppm Ru, based on the polymer) in 1.6 kg butanone was added and hydrogenation was carried out for 5 hours at 135° C. under a hydrogen pressure of 140 bar. The product properties (I) are summarized in Table 1.

EXAMPLE 2 (COMPARISON EXAMPLE)

The procedure was as in example 1, but the hydrogenation was carried out using 1.693 g catalyst (85 ppm Ru, based on the polymer). After a reaction of 5 hours at 135° C. under a hydrogen pressure of 140 bar, the degree of hydrogenation was 96.0%, and after cooling and letting down the reactor it was 97.5% (in each case determined by IR spectroscopy).

EXAMPLE 3

A solution, carefully prepared with exclusion of oxygen, of 2.1 kg of the same polymer as in example 1 in 15.38 kg butanone was initially introduced into a 40 l autoclave rendered inert with nitrogen, and 2.93 kg 2-propanol, which had carefully been freed from dissolved oxygen beforehand, were added. The mixture was heated up to 125° C. in the absence of hydrogen, a solution, likewise carefully prepared with exclusion of oxygen, of 1.693 g tris(triphenylphosphane)-ruthenium-(II) chloride (85 ppm Ru, based on the polymer) in 1.6 kg butanone was added and hydrogenation was carried out for 5 hours at 135° C. under a hydrogen pressure of 140 bar. The product properties are summarized in Table 1.

EXAMPLE 4

Mixtures were prepared according to the following recipe from the polymers prepared according to example 1 and 3:

100.00 parts by wt. hydrogenated polymer
3.00 parts by wt. zinc oxide
   (®Zinkoxyd aktiv from Bayer AG, Leverkusen was used)
2.00 parts by wt. magnesium oxide
   (®Maglite DE from Merck & Co. Inc., USA was used)
1.00 part by wt. octylated diphenylamine
   (®Vulkanox OCD from Bayer AG, Leverkusen was used)
0.50 part by wt. zinc salt of 2-mercaptobenzimidazole
   (®Vulkanox ZMB 2 from Bayer AG, Leverkusen was used)
45.00 parts by wt. carbon black N 326
   (®Corax N 326 from Degussa AG, Wesseling was used)
3.00 parts by wt. triallyl isocyanurate
   (®Perkalink 301-50 Dpd from Akzo-Chemie, Düren was used)
7.00 parts by wt. bis(tert.-butylperoxyisopropyl)benzene (40%)
   (®Perkadox 14/40 from Akzo-Chemie, Düren was used)

The values determined for the vulcanization products (II) are listed in Table 1. The vulcanization was carried out at 180° C. for 15 minutes. Tempering at 150° C. was then carried out for 6 hours. The S 2 bar was used as the test specimen.

TABLE 1

| | | (comparison) Example 1 | Example 3 |
|---|---|---|---|
| (I) | [a] | 99.6 | 99.8 |
| | [b] | 1.0 | 0.5 |
| | [c] zero value | 90 | 86 |
| | after storage in hot air at 100° C. for 3 days | 124 | 98 |
| | [d] | 246 | 233 |
| | [e] | 43.4 | 42.9 |
| (II) | S (MPa) | 28.7 | 27.6 |
| | E [%] | 245 | 245 |
| | $M_{100}$ [MPa] | 4.4 | 4.0 |
| | $M_{200}$ [MPa] | 20.1 | 18.8 |
| | $H_{23}$ | 70 | 69 |
| | CS [%] | 40.4 | 36.9 |

Table 1 shows that, compared with the prior art, the product prepared according to the invention gives a vulcanization product with a more advantageous compression set.

EXAMPLE 5 (COMPARISON EXAMPLE)

A solution, carefully prepared with exclusion of oxygen, of 2.1 kg of the same polymer as in example 1 in 17.9 kg acetone was initially introduced into a 40 l autoclave rendered inert with nitrogen. The solution was heated up to 125° C. in the absence of hydrogen, a solution, likewise carefully prepared with exclusion of oxygen, of 3.984 g tris(triphenylphosphane)-ruthenium-(II) chloride (200 ppm Ru, based on the polymer) in 1.6 kg acetone was added and hydrogenation was carried out for 5 hours at 135° C. under a hydrogen pressure of 140 bar. The product properties (I) are summarized in Table 2.

EXAMPLE 6 (COMPARISON EXAMPLE)

The procedure was as in example 5, but the hydrogenation was carried out using 1.693 g catalyst (85 ppm Ru, based on the polymer). After a reaction of 5 hours at 135° C. under a hydrogen pressure of 140 bar, the degree of hydrogenation was 93.4%, and after cooling and letting down the reactor it was 95.6% (in each case determined by IR spectroscopy).

EXAMPLE 7

A solution, carefully prepared with exclusion of oxygen, of 2.1 kg of the same polymer as in example 1 in 15.38 kg acetone was initially introduced into a 40 l autoclave rendered inert with nitrogen, and 2.93 kg 2-propanol, which had carefully been freed from dissolved oxygen beforehand, were added. The mixture was heated up to 125° C. in the absence of hydrogen, a solution, likewise carefully prepared with exclusion of oxygen, of 1.693 g tris(triphenylphosphane)-ruthenium-(II) chloride (85 ppm Ru, based on the polymer) in 1.6 kg acetone was added and hydrogenation was carried out for 5 hours at 135° C. under a hydrogen pressure of 140 bar. The product properties (I) are summarized in Table 2.

EXAMPLE 8

Vulcanization products, the properties of which (II) are listed in Table 2, were prepared in accordance with example 4 from the polymers prepared according to examples 5 and 7.

TABLE 2

| | | (comparison) Example 5 | Example 7 |
|---|---|---|---|
| (I) | [a] | 99.4 | 99.4 |
| | [b] | 0.8 | 0.7 |
| | [c] zero value | 82 | 79 |
| | after storage in hot air at 100° C. for 3 days | 111 | 85 |
| | [d] | 198 | 188 |
| | [e] | 37.1 | 37.7 |
| (II) | S (MPa) | 28.0 | 29.5 |
| | E [%] | 240 | 260 |
| | $M_{100}$ [MPa] | 4.3 | 4.0 |
| | $M_{200}$ [MPa] | 19.7 | 18.5 |
| | $H_{23}$ | 69 | 70 |
| | CS [%] | 41 | 35.8 |

Table 2 shows that, compared with the prior art, the product prepared according to the invention gives a vulcanization product with a more advantageous compression set.

EXAMPLE 9

The procedure was analogous to example 7. Keeping the polymer feed constant (2.1 kg) and the total amount of solvent approximately constant, the composition of the solvent of acetone/2-propanol was varied in accordance with Table 3. After in each case a reaction time of 5 hours at 135° C. under a hydrogen pressure of 140 bar, a sample was removed from the reactor for analysis of the degree of hydrogenation, and the hydrogenation was then ended. The product properties (I) are to be found in Table 4.

EXAMPLE 10

Vulcanization products, the properties of which (II) are listed in Table 4, were prepared in accordance with example 4 from the polymers of example 9.

TABLE 3

Influence of the 2-propanol concentration in the solvent on the degree of hydrogenation

| | (comp.) | | | | |
|---|---|---|---|---|---|
| Example no. | 6 | 9 | 7 | 9 | 9 |
| Amount of solvent used ignoring the catalyst solution | | | | | |
| acetone (kg) | 17.9 | 16.88 | 16.38 | 13.38 | 11.48 |
| 2-propanol (kg) | 0.0 | 1.46 | 2.93 | 4.88 | 6.83 |
| 2-Propanol content, based on the total solvent (including catalyst solution) (wt. %) | 0 | 7.3 | 14.7 | 24.6* | 34.3* |
| Degree of hydrogenation after a reaction of 5 hours at 135° C./140 bar hydrogen pressure (%) | 93.4 | 97.8 | 98.9 | 99.3 | 99.6 |

*The reaction mixture taken from the reactor was not a single phase.

TABLE 4

| | | Example | | | |
|---|---|---|---|---|---|
| | | 9 | 7 | 9 | 9 |
| | 2-Propanol content of the total solvent (wt. %) | 7.3 | 14.7 | 24.6 | 34.3 |
| (I) | [a] | 98.8 | 99.4 | 99.3 | 99.8 |
| | [b] | 0.4 | 0.7 | 0.3 | 0.4 |
| | [c] zero value | 78 | 79 | 79 | 82 |
| | after storage for 3 days in hot air at 100° C. | 83 | 85 | 85 | 95 |
| | [d] | 169 | 188 | 175 | 191 |
| | [e] | 34.9 | 37.7 | 36.9 | 38.7 |
| (II) | S (MPa) | 28.7 | 29.5 | 26.4 | 28.7 |
| | E [%] | 245 | 260 | 235 | 245 |
| | $M_{100}$ [MPa] | 4.4 | 4.0 | 4.2 | 4.2 |
| | $M_{200}$ [MPa] | 20.0 | 18.5 | 19.3 | 19.5 |
| | $H_{23}$ | 70 | 70 | 69 | 69 |
| | CS [%] | 36.6 | 35.8 | 37.3 | 37.5 |

EXAMPLE 11 (COMPARISON EXAMPLE)

The procedure was analogous to example 7, but the 2-propanol was replaced by methanol. Keeping the polymer feed constant (2.1 kg) and the total amount of solvent approximately constant, the composition of the solvent of acetone/methanol was varied in accordance with Table 5. After in each case a reaction time of 5 hours at 135° C. under a hydrogen pressure of 140 bar, a sample was removed from the reactor for analysis of the degree of hydrogenation by IR spectroscopy. The results are likewise to be found in Table 5. According to these, methanol as a constituent of the solvent significantly impairs the degree of hydrogenation.

TABLE 5

Influence of methanol in the solvent on the degree of hydrogenation

| | Example no. | | |
|---|---|---|---|
| | (comp.) 6 | 11 | 11 |
| Amount of solvent used ignoring the catalyst solution | | | |
| acetone (kg) | 17.9 | 16.88 | 15.38 |
| methanol (kg) | 0.0 | 1.46 | 2.93 |
| Methanol content, based on the total | 0 | 7.3 | 14.7 |

TABLE 5-continued

Influence of methanol in the solvent on the degree of hydrogenation

| | Example no. | | |
|---|---|---|---|
| | (comp.) 6 | 11 | 11 |
| solvent (incl. catalyst solution) (wt. %) | | | |
| Degree of hydrogenation after a reaction of 5 hours at 135° C./140 bar hydrogen pressure (%) | 93.4 | 57.9 | 56.1 |

EXAMPLE 12

Hydrogenations were carried out in accordance with example 11 using acetone/ethanol mixtures. The mixing ratios used and the degrees of hydrogenation achieved are listed in Table 6. It can be seen that additions of ethanol impair the degree of hydrogenation.

TABLE 6

Influence of ethanol in the solvent on the degree of hydrogenation

| | Example no. | | |
|---|---|---|---|
| | (comp.) 6 | 12 | 12 |
| Amount of solvent used ignoring the catalyst solution | | | |
| acetone (kg) | 17.9 | 16.88 | 15.38 |
| ethanol (kg) | 0.0 | 1.46 | 2.93 |
| Ethanol content, based on the total solvent (incl. catalyst solution) (wt. %) | 0 | 7.3 | 14.7 |
| Degree of hydrogenation after a reaction of 5 hours at 135° C./140 bar hydrogen pressure (%) | 93.4 | 40.2 | 40.6 |

EXAMPLE 13

A solution, carefully prepared with exclusion of oxygen, of 2.1 kg of the same polymer as in example 1 in 15.39 kg butanone was initially introduced into a 40 l autoclave rendered inert with nitrogen, and 3.0 kg 1-propanol, which had carefully been freed from dissolved oxygen beforehand, were added. The mixture was heated up to 125° C. in the absence of hydrogen, a solution, likewise carefully prepared with exclusion of oxygen, of 1.693 g tris(triphenylphosphane)-ruthenium-(II) chloride (85 ppm Ru, based on the polymer) in 1.6 kg butanone was added and hydrogenation was carried out for 5 hours at 135° C. under a hydrogen pressure of 140 bar. Further hydrogenation experiments were performed, 1-propanol being replaced by 1-butanol, 2-butanol and 2-methyl-2-propanol.

The degrees of hydrogenation determined in each case after a reaction time of 5 hours at 135° C. under a hydrogen pressure of 140 bar can be seen from Table 7.

TABLE 7

Influence of various alcohols in the solvent on the degree of hydrogenation

| | Example no. | | | | |
|---|---|---|---|---|---|
| | comp. 2 | 13 | 13 | 13 | 13 |
| Amount of solvent used ignoring the catalyst solution | | | | | |
| butanone (kg) | 17.9 | 15.39 | 15.39 | 15.39 | 15.39 |
| 1-propanol (kg) | — | 3.0 | — | — | — |
| 1-butanol (kg) | — | — | 3.0 | — | — |
| 2-butanol (kg) | — | — | — | 3.0 | — |
| 2-methyl-2-propanol (kg) | — | — | — | — | 3.0 |
| Alcohol content, based on the total solvent (including catalyst solution) (wt. %) | 0 | 15.0 | 15.0 | 15.0 | 15.0 |
| Degree of hydrogenation after a reaction of 5 hours at 135° C./140 bar hydrogen pressure (%) | 96.0 | 42.8 | 44.4 | 98.8 | 97.0 |

EXAMPLE 14 (COMPARISON EXAMPLE)

A solution, carefully prepared with exclusion of oxygen, of 180 g of a randomly built up acrylonitrile/-butadiene emulsion copolymer (acrylonitrile content: 34.8 wt. %, Mooney viscosity ML 1+4 (100° C.) of 29) in 1,451 g butanone was initially introduced into a 3 l autoclave rendered inert with nitrogen. The solution was heated up to 125° C. in the absence of hydrogen, a solution, likewise prepared under exclusion of oxygen, of 143.5 mg RuH(CH$_3$COO)(PPh$_3$)$_3$ (85 ppm Ru, based on the polymer; Ph=phenyl) in 162 g butanone was added and hydrogenation was carried out for 5 hours at 135° C. under a hydrogen pressure of 140 bar. A sample was then removed for determination of the degree of hydrogenation. The degree of hydrogenation, determined by IR spectroscopy, was 90.4%.

EXAMPLE 15

A solution, carefully prepared with exclusion of oxygen, of 180 g of the same polymer as in example 14 in 1,210 g butanone was initially introduced into a 3 l autoclave rendered inert with nitrogen, and 242 g 2-propanol, which had carefully been freed from dissolved oxygen beforehand, were added. The mixture was heated up to 125° C. in the absence of hydrogen, a solution, likewise prepared with exclusion of oxygen, of 143.5 mg RuH(CH$_3$COO)(PPh$_3$)$_3$ (85 ppm Ru, based on the polymer; Ph=phenyl) in 162 g butanone was added and hydrogenation was carried out for 5 hours at 135° C. under a hydrogen pressure of 140 bar. The degree of hydrogenation determined by IR spectroscopy on a sample taken from the reactor was 99.2%.

EXAMPLE 16 (COMPARISON)

The procedure was analogous to example 14. However, 173.4 mg RuH$_2$(PPh$_3$)$_4$ (85 ppm Ru, based on the polymer; Ph=phenyl) were used as the catalyst. The degree of hydrogenation was 72.1% (determined by IR spectroscopy).

EXAMPLE 17

The procedure was analogous to example 15. However, 173.4 mg RuH$_2$(PPh$_3$)$_4$ (85 ppm Ru, based on the polymer; Ph=phenyl) were employed as the catalyst.

The degree of hydrogenation was determined as 98.4% by means of IR spectroscopy.

In all the examples carried out according to the invention, no hydrogenation of the nitrile groups was to be found by IR spectroscopy on the resulting products.

I claim:

1. Process for the selective hydrogenation of olefinically unsaturated polymers containing nitrile groups with hydrogen in the presence of a hydrogenation catalyst in an organic solvent, characterized in that (i) the hydrogenation catalyst used is a ruthenium compound of the formula $$RuX_{2y}[(L^1)_n(L^2)_{5-z}] \qquad (I)$$

wherein

X denotes hydrogen, halogen or $SnCl_3$, $L^1$ denotes hydrogen, halogen, $(R^6\text{-COO})_n$ or cyclopentadienyl of the formula

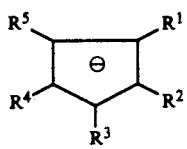

in which $R^1$ to $R^5$ independently of one another represent hydrogen, methyl, ethyl or phenyl, it also being possible for adjacent substituents together to form a hydrocarbon radical such that $L^1$ is an indenyl or a fluorenyl system, $L^2$ denotes a phosphane, bisphosphane or arsane and y denotes zero, 0.5 or 1, n denotes 1 or 2, z denotes an integer from 1 to 4 and $R^6$ denotes alkyl, cycloalkyl, aryl or aralkyl having 1 to 20 C atoms, and (ii) the solvent used is a mixture of
  (a) a $C_3$–$C_6$ ketone and
  (b) a monohydric secondary or tertiary $C_3$–$C_6$-alcohol, the weight content of (b) in the solvent (ii) being 2 to 60%.

* * * * *